No. 853,174. PATENTED MAY 7, 1907.
J. E. JONES.
STABLE APPLIANCE.
APPLICATION FILED JAN. 16, 1907.
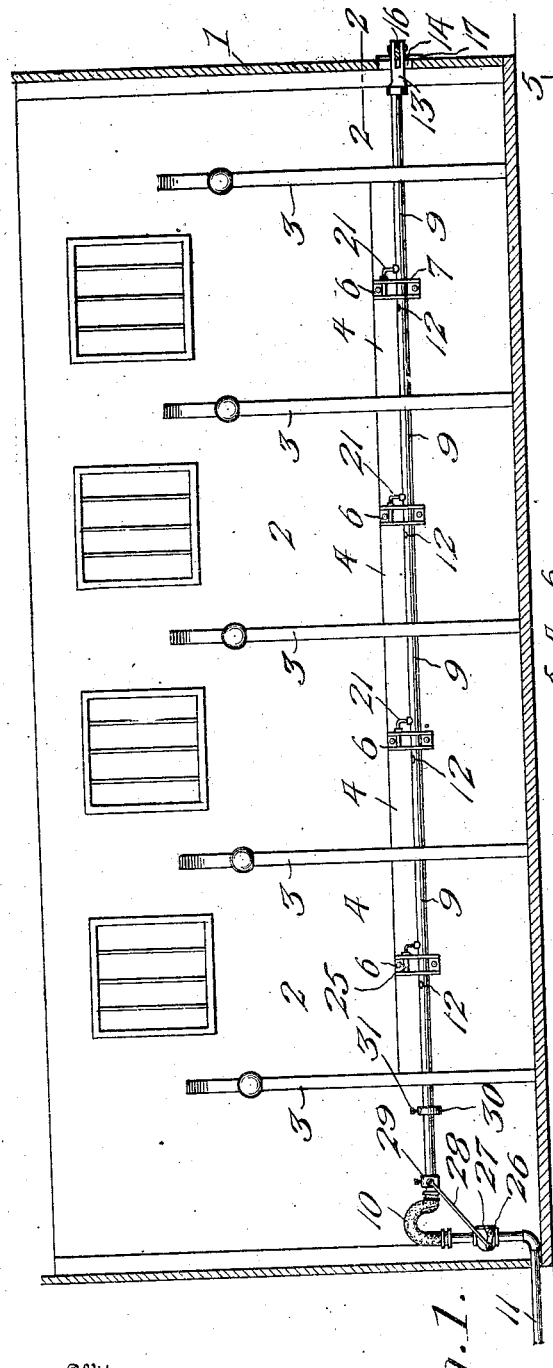
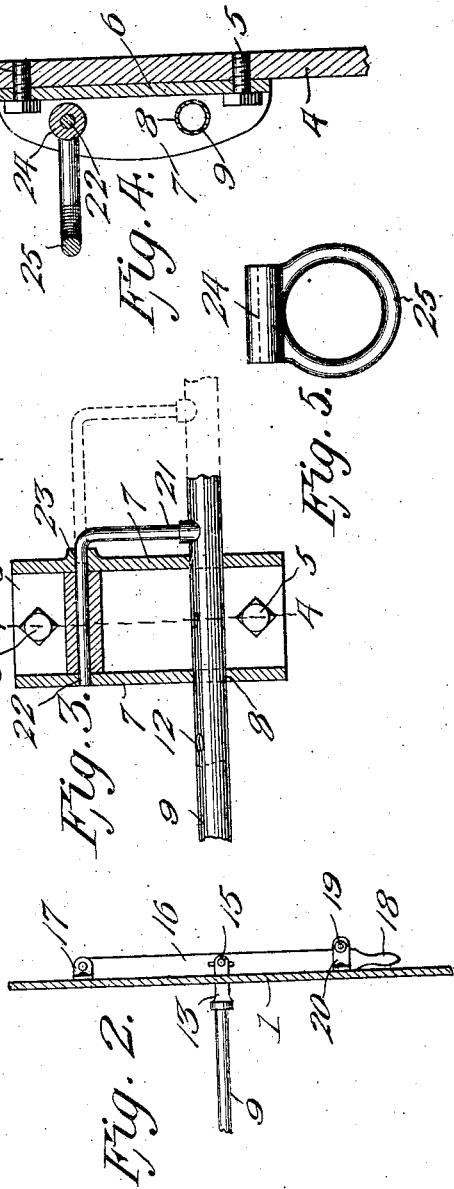
Inventor
Jesse E. Jones
Witnesses
Frank B. Hoffman
F. S. Elmore
By Victor J. Evans
Attorney

UNITED STATES PATENT OFFICE.

JESSE ELMER JONES, OF WEST MIDDLETON, INDIANA.

STABLE APPLIANCE.

No. 853,174.  Specification of Letters Patent.  Patented May 7, 1907.

Application filed January 16, 1907. Serial No. 352,583.

*To all whom it may concern:*

Be it known that I, JESSE ELMER JONES, a citizen of the United States, residing at West Middleton, in the county of Howard and State of Indiana, have invented new and useful Improvements in Stable Appliances, of which the following is a specification.

This invention relates to stable appliances, being directed especially to an improved form of hitching and unhitching device, and embodies a longitudinally movable pipe having jet openings and equipped with hitching members or arms on which the halter rings are pivoted, there being connected with the pipe an operating lever through the medium of which the same may be moved longitudinally for releasing the rings, while connected in the pipe is a cut-off valve operable through the movement of the pipe for turning on the water when the pipe is moved to releasing position.

The invention has for its objects to provide a comparatively simple, inexpensive device of this character by means of which the horses may, in the event of fire, be quickly released, one wherein the pipe will be normally locked against movement and the water supply cut off, and one wherein, upon release of the animals, jets of water will be thrown upon them for driving them from the stalls.

With these and other objects in view, the invention comprises the novel features of construction and combination of parts more fully hereinafter described.

In the accompanying drawings: Figure 1 is a view, partly in section of a stable equipped with the appliance embodying the invention. Fig. 2 is a detail, sectional view taken on the line 2—2 of Fig. 1, and showing the operating lever. Fig. 3 is an enlarged detail view, partly in section, of a portion of the pipe, showing one of the locking arms carried thereby. Fig. 4 is a detail, sectional view taken on the line 4—4 of Fig. 3. Fig. 5 is a detail view of one of the hitching rings.

Referring to the drawings, 1 designates a stable containing a plurality of stalls 2 formed by partitions, there being arranged in each of the stalls a feed box or receptacle 4, these parts, which are conventionally shown herein, being of the usual or any appropriate construction and material.

Secured to the front walls of the boxes 4 by means of fastening members or screws 5 are metal bearings 6 having spaced side portions or flanges 7 provided with bearing openings 8 adapted to receive a longitudinally movable pipe or duct 9 extended through the stable at the front of the boxes 4 and connected at one end by means of a flexible tubular coupling section 10 with a water main 11 which enters the stable through the adjacent end wall thereof, while attached to the other end of the pipe, which is provided with a plurality of uniformly spaced jet openings 12, is a forked bearing head 13 arranged to project through an opening 14 in the adjacent end wall of the stable and is pivoted at 15 to an operating lever 16 in turn pivoted at one end to a bearing 17 attached to said wall. The lever 16, which is provided with a handle 18, is normally locked by means of a pin 19 entered through a keeper 20 which receives the end of the lever.

Fixed on the pipe 9 is a plurality of substantially L-shaped arms 21 having the horizontal portions 22 thereof projected through bearing openings 23 formed in the flanges 7 of the brackets 6 and engaged with the tubular portions 24 of hitching members or rings 25 for pivoting the latter to the respective brackets, while arranged in the main 11 is a cut-off valve having its stem 26 provided with a crank arm 27 connected by a link 28 with a collar 29 fixed on and for movement with the pipe 9.

In practice, when the parts are in normal position, as in Fig. 1, the cut-off valve within the main 11 is closed for cutting off the supply of water to the pipe 4 and the openings 12 stand to a position at one side of the adjacent brackets 6 with the lever 16 locked by means of the pin 19, as in Fig. 2. Under these conditions, the hitching straps are engaged with the hitching rings 25 for tying the animals in the stalls, the rings being pivotally held in the brackets 6 by means of the horizontal portions 22 of the members 21. Under these conditions and in the event of a fire the pin 19 is withdrawn from the keeper 20, thereby releasing lever 16 for permitting its operation to move the pipe 9 longitudinally in the direction indicated by the arrow in Fig. 1, thereby moving the arms 21 to the position shown by dotted lines in Fig. 3, for withdrawing the portions 22 of the arms out of engagement with the hitching rings, thus to release the latter and free the animals. As the pipe moves forwardly the openings 12 are carried to the dotted line position shown in Fig. 3, the crank arm 27 being, at the same time, operated through the medium of the link for opening the valve and allowing the water to flow from the main to the pipe 9, from which jets of water are thrown through the openings 12 into the animals' faces for causing them to leave the stalls. The extent of movement of the pipe 9 is limited by means of a stop collar 30 adjustably secured on the pipe by means of a set screw 31, whereby the arms 21 will move sufficiently to release the hitching rings without becoming entirely disengaged from the brackets 6.

Having thus described my invention, what I claim is:

In a device of the class described, a plurality of brackets or supporting devices having flanges at the sides thereof provided with bearing openings and apertures, a longitudinal movable pipe supported in said bearing openings and having discharge openings in proximity to the flanged supporting members, L-shaped arms connected with the pipe adjacent to the supporting members and including laterally extending approximately horizontal members adapted to engage the apertures in the side flanges of said supporting members, hitching rings having tubular members fitted between the flanges of the supporting devices and adapted to be engaged by the horizontal members of the L-shaped arms, a water supply pipe adjacent to one end of the longitudinally movable pipe and having a valve the stem of which is provided with a crank arm, a link connecting said crank arm with the longitudinally movable pipe, a flexible duct connecting the latter with the supply pipe, and means for moving the longitudinally movable pipe.

In testimony whereof, I affix my signature in presence of two witnesses.

JESSE ELMER JONES.

Witnesses:
J. L. HARPER,
C. F. CASANOV.